Patented Aug. 9, 1932

1,870,245

UNITED STATES PATENT OFFICE

HARRY C. FISHER, OF NORWOOD, OHIO, ASSIGNOR TO THE RICHARDSON COMPANY, OF LOCKLAND, OHIO, A CORPORATION OF OHIO

MOLDED PRODUCT SIMILAR TO STONEWARE AND PROCESS OF MAKING THE SAME

No Drawing.   Application filed January 2, 1929.   Serial No. 329,938.

My invention has to do with a new product of ceramic, glassy or stone-like characteristics, and processes of making it.

Hitherto in the production of ceramic materials for containers, insulators and molded products in general, clay or similar materials have been brought to a plastic condition, molded, air-dried, and then cured or baked in a kiln for various lengths of time from a few hours to days and weeks. Not only do these processes consume a comparatively great length of time, but they are productive of a large number of imperfect articles or rejects due to what might be termed accidents of production, which may occur anywhere along the line of the complicated procedure incident to their production. Thus, cracking and warping in the kiln, as a single example, is productive of much wastage.

It is a purpose of my invention to provide a method for the making of articles of ceramic nature which involves only the formation of a suitable plastic and the molding of this plastic under heat, whereby I am able to do away with air-drying and curing after molding and to produce a very much higher percentage of perfect articles.

It is another object of my invention to provide a new type of article which is fibrous in its nature and which has new and peculiar properties derived from this characteristic. Here, so far as I am aware, I am working in a new field;—in the conception of a fibrous ceramic article analogous to a fibrous article produced, for example, from a bituminous binder and a fibrous reinforcement, without the heat treating step incident to ceramic production.

It is still a further object of my invention to provide a method whereby a product ranging in its characteristics from a material which has merely been hardened and dehydrated by heat, to a material which has been so thoroughly re-fused as to be porcelain-like and glassy in its nature.

It is still another purpose of my invention to provide a process which permits the production of synthetic stone materials in two steps:—one of mixing, and one combining a molding and heat treating step, whereby an article may be made in a few minutes.

It is still a further object of my invention to provide an article which has a base of alkaline or other silicates, which may contain filler materials of fibrous or other character, and which may ultimately be either combined into practically a homogeneous mass or may exist in the form of a hardened binder with a suspension of filler materials therein and/or a separate reinforcing fibrous structure.

It is still a further object of my invention to make an artificial stoneware of asbestos materials and sodium or potassium silicates, with or without other materials.

It is still a further object of my invention so to treat a molding composition comprising sodium or potassium silicates with other materials, as to produce in the final product a body of hard insoluble glassy substance which is different in its characteristics from a dehydrated body of the so-called soluble silicates.

These and other objects of my invention which will be apparent to one skilled in the art upon reading this specification, I accomplish in that product and process of making it of which I shall now describe preferred embodiments.

Briefly, one phase of the invention comprises placing a solution of sodium silicate in a mixer of the Werner-Pfleiderer type, to which heat is applied until the solution loses enough water to convert it into a sticky, adhesive, gummy mass of considerable body. Then a substantially noncombustible fiber such as asbestos is worked into the mass by the action of the mixer. I prefer to bring the silicate mass, which I refer to as the binder, for convenience, into such a condition that when the aggregated masses of asbestos fiber are brought into contact with it, there will be a teasing out of these aggregated masses by the pulling and stretching action of the mixer to such an extent that the asbestos aggregates will be broken down into individualized fibers and these fibers will be homogeneously distributed throughout the mass and re-felted together therein. This action is a characteristic one and can be readily detected by inspection.

By aggregated masses of asbestos fiber, I do not refer to asbestos rock before a crushing has developed the fiber. On the contrary, I refer to such pads, aggregates and masses of asbestos fiber as are ordinarily found in material of appreciable fiber length when shipped. I am not restricted in my process to the use of noncombustible fibrous material or material of such fiber length that it can be felted together, although this is the material which I prefer to use, and which gives the best results in the mixing process I have just described. Nor am I restricted in my process to the use of the mixing method which I have described above although I prefer it. Other mixing methods also give satisfactory results, such as mixing with the silicate solution so thin that it is not adhesive and extensible enough of itself to produce the action on the fibers which I have described.

Finally the fibrated sodium silicate is removed from the mixer and placed in a suitable mold and molded at a temperature ranging from room temperature to a bright red heat, say 1500° F. Under this molding, the article is shaped, dehydrated and hardened, and, depending upon the degree of temperature used, it may exhibit varying degrees of physical coalescence ranging from incipient sintering to complete fusion; and depending upon the materials used, it may exhibit some chemical change. It is advantageous, of course, to have the mass as dry before molding as is consistent with proper plasticity.

Depending upon the molding temperature, different results can be obtained. At room temperature, if the fibrated sodium silicate has been introduced into the mold as dry as possible, a glassy fibrated sodium silicate article will be obtained which will be found to be semi-water soluble, for the reason that the silicate has not been thoroughly dehydrated. It is well known that if silicate of soda with a ratio of soda to silica of around 1:3.25 or 1: more than 3.25 in water solution is once thoroughly dehydrated, it is so very difficultly resoluble as to be to all intents and purposes insoluble as an ordinary article.

If the molding temperature ranges from 150° to 200° F. or thereabouts, the article produced will contain a greater or less quantity of dehydrated sodium silicate, will appear less glassy and will be less soluble in water than the product of the first example. When dehydrated under temperature, sodium silicate shows a tendency to whiten or intumesce, which is believed to be due to the formation of hollows or bubbles therein by the escaping steam.

If the molding temperature ranges between 200° and 400° F. an article of much less solubility in water will be obtained.

At temperatures of 900° to 1000° F. a substantially water-insoluble glassy stage will commence to be produced in the article, and there may be some slight chemical combination of silicate with asbestos.

At temperature ranges higher than this, greater re-fusion of the sodium silicate into its original water-insoluble glassy form will take place, and there will be an increasing tendency toward combination with the asbestos, until at temperatures verging on bright red heat, the identity of the asbestos will be practically lost inasmuch as it will have combined more or less completely with re-fused sodium silicate.

For my molds, to withstand the high temperatures used, I prefer to employ heat resistant alloys.

The molds may be heated before being placed in the press and the molding done under their residual heat. They may, however, be electrically heated in place so that it is not necessary to remove them from the press; or they may be heated in place by gas flames or the like. Uniform temperatures in the molds are desirable, and for this reason I prefer either to remove the molds from the press and heat them in a furnace for the purpose, or to electrically heat them in place.

I prefer to use hydraulic presses of commercially high ram pressure.

The function of asbestos in compounds molded at temperatures below that at which combination between it and the silicate occurs, or at temperatures below the dehydration point of the particular asbestos fiber employed, seems to be merely that of a fibrous strengthening in a plastic compound. At temperatures higher than this, the fibrous asbestos first imparts strength to the molded article as before, and after the chemical combination may in certain instances combine with the silicate or other materials present into what is apparently a more or less distinctly fibrous material of an entirely new composition.

This is to say a given fibrous pad of asbestos may become a more or less distinct fibrous pad of a substance formed by the combination of asbestos and silicate. In other instances the effect of high temperature may be to give a compound to all intents and purposes homogeneous in its nature in which the fibrous characteristic has been lost in a completely re-fused condition.

An example of a formula giving a compound which can be molded at either low or high temperatures, comprises 60% of sodium silicate of 43° Baumé and a factor of 1 $Na_2O$ to 3.25 $SiO_2$, and 40% of an asbestos fiber of appreciable length. A compound formed upon this formula may be attacked by boiling water over long periods.

To reduce its slight solubility and also to give a different type of compound, various glass-making, pottery-making or fluxing materials can be introduced into the compound in the mixer. Examples are lead compounds such as white or red lead, and feldspar, limestone, borax and the like.

At least two different procedures can be followed in introducing these substances. One is to use solutions of metallic salts which will react in the mixer to form insoluble silicates in flaky or dispersed form, which in the molding step may be fused down into a solid insoluble glass. For example, in the use of lead, a solution of lead acetate sufficient to react with part or all of the sodium silicate to form lead silicate can be introduced into the mixer after the distribution of fibers has been accomplished. Molding may then be carried on at a temperature sufficient to fuse down the already formed lead glass precipitate.

Secondly, metal compounds may be added which will not react with the silicate to form insoluble glasses until during the molding step. Thus, lead oxides can be introduced as powders into the silicate plastic in the mixer just as non-fibrous fillers are introduced into other plastics such as the resins and bituminous compounds. Here the mixing will be followed by a hot molding which causes a reaction of the sodium silicate or a part of it with the lead oxide to produce a lead glass.

A solution of borax can be mixed into a solution of soluble silicate; or a water solution of borax can be added to the watery solution of sodium silicate before any other material is added, so that the fluxing action of the borax will be obtained in the molding stage where a temperature is used high enough to produce fusion. A low melting point powdered glass obtained as a waste material from ordinary glass-making processes, or powdered slag of low melting point, may be added to the silicate solution either before or after its evaporation down into the plastic stage. If desired, infusible fillers such as the diatomaceous earths, powdered slate dust and the like may be introduced into the compound either before or during the mixing stage, so that the final substance obtained after the fusion-molding stage will comprise a glassy material surrounding non-glassy filler.

Obviously also pigmenting or coloring agents may be added, or the silicate itself may be colloidally colored in its formation. Varying color effects may be obtained from the same pigment at varying temperatures and in the presence of varying substances with which the pigment might react. Thus, red oxide of iron, depending upon the temperature used, will give a product varying from red to dark brown.

I shall now give an example of a formula producing an insoluble glass and containing a filler:—65.6% of sodium silicate as above, 7.1% powdered white clay, 20.2% lead acetate crystals, and 7.1% of long fibered asbestos may be used. The watery solution of 43° Baumé, factor 1 to 3.25 silicate, is placed in a warm Werner-Pfleiderer mixer. The clay is mixed in and then the asbestos is fibrated in as described. Then the lead acetate in very concentrated solution is added and mixed into the plastic, whereupon the reaction with a portion of the silicate produces curdled particles of silicate of lead. This material is mixed hot until a moldable mass is produced and is molded under heat. It may be molded, as an example, into a bar or slab five inches long by one-half inch thick, with the mold held at 1300° F. This produces a glassy, substantially water-insoluble stone.

Another modification of this same formula may be made using a powdered red or yellow lead oxide, equivalent chemically to the lead acetate called for above, and by mixing it into the sodium silicate like a filler material. The subsequent high pressure, heat-molding step will produce substantially the same glassy material as has already been described, providing the lead oxide particles are fine enough to permit their distribution intimately throughout the entire compound. The white clay is a substantially inert filler at the temperature specified and remains present as such after the other parts of the compound have fused together.

Varying colors and textures in the synthetic stone can be produced by varying my process as outlined; my material may be colored as desired, and it is suitable, as will be apparent, for a large number of uses. Various articles of stoneware may be produced from it, and it is suitable for the production of insulators and electrical parts, tiles for interior decorations, vessels and the like. It will be evident that my product is not confined to those formulas which I have given as typical examples, and that my process may be varied without departing from the spirit of my invention.

Nor is my invention confined to the use of asbestos, heat-resistant or incombustible fibers. Of incombustible fibers there are a large number adaptable to my process, such as steel or other metallic fibers, glass, mineral or slag wool, and the like. I prefer to use an incombustible fiber because it involves no difficulties with gases of decomposition generated by the high heat, or a deposit of carbon and the like throughout the mass, and also because in many forms of my product I am able to provide a resident and strengthening mat of fibers throughout the body. By the term "heat resistant" I do not, of course, desire to exclude fibers, such as asbestos, which may ultimately lose their fibrous form under very high heats, as by dehydration, nor fibers which by interaction with other ingredients lose their identity wholly or in part, or become converted into a fibrous structure of a new composition.

Having thus described my invention, what I claim as new and desire to secure by Letters Patent, is:—

1. A glass-like molded artificial stone product comprising a body of soluble silicate through which asbestos fibers and non-fibrous filler materials have been dispersed.

2. An artificial stone product comprising a body of silicate, a portion at least of which is an insoluble metal silicate, said body containing in distribution filler materials, said product having a substantially non-porous and glassy texture.

3. A glass-like molded artificial stone product comprising a body of silicate, a portion at least of which is an insoluble metal silicate, said body containing in distribution filler materials.

4. A glass-like molded artificial stone product comprising dehydrated sodium silicate of a factor 1 $Na_2O$ to 3.25 $SiO_2$ and asbestos fiber of appreciable length.

5. A glass-like molded artificial stone product comprising 60% dehydrated sodium silicate of a factor 1 $Na_2O$ to 3.25 $SiO_2$ and 40% asbestos fiber of appreciable length.

6. A glass-like molded artificial stone product comprising dehydrated sodium silicate, filler, a metal salt adapted to form an insoluble silicate, and asbestos.

7. A glass-like molded artificial stone product comprising dehydrated sodium silicate, filler, a metal salt adapted to form an insoluble silicate, and asbestos, said body molded and dehydrated under heat and pressure, and re-fused thereby into a hard, insoluble glass-like substance.

8. A glass-like molded artificial stone product comprising 65.6% sodium silicate, 7.1% inert filler, 20.2% of insoluble silicate-forming metal compound of the chemical equivalent of lead acetate, and 7.1% asbestos of appreciable fiber length.

9. A glass-like molded artificial stone product comprising 65.6% sodium silicate, 7.1% inert filler, 20.2% of insoluble silicate-forming metal compound of the chemical equivalent of lead acetate, and 7.1% asbestos of appreciable fiber length.

10. A glass-like molded artificial stone product comprising in its composition sodium silicate, an insoluble silicate-forming metal compound, asbestos of appreciable fiber length, and a coloring matter.

11. A glass-like molded artificial stone product comprising its composition sodium silicate, an insoluble silicate-forming metal compound, asbestos of appreciable fiber length, and a coloring matter.

12. That process of producing an artificial stone product which comprises mixing a heat resistance fibrous material into a solution of silicate to form a plastic compound thereof and molding said compound under pressure and under heat sufficient to dehydrate it, and to bring about at least a sintering in the mass.

13. That process of producing an artificial stone compound which comprises mixing a heat resistant fibrous material into a solution of a silicate so as to form a plastic mass thereof, and molding said mass under pressure and under heat sufficient, first, to dehydrate it, and second, to re-fuse it into a hard glassy material.

14. That process of making an artificial stone product which comprises thickening a solution of a soluble silicate until it assumes a gummy adhesive condition, homogeneously distributing therethrough a fibrous material so as to form a plastic compound, and molding said plastic compound under pressure and heat.

15. That process of making an artificial stone product which comprises thickening a solution of a soluble silicate until it assumes a gummy adhesive condition, homogeneously distributing therethrough a heat resistant fibrous material so as to form a plastic compound, and molding said plastic compound under pressure and heat, said heat being sufficient to dehydrate said silicate so as to produce a hard substantially insoluble stony article.

16. That process of making an artificial stone product which comprises thickening a solution of a soluble silicate until it assumes a gummy adhesive condition, homogeneously distributing therethrough a heat resistant fibrous material so as to form a plastic compound, and molding said plastic compound under pressure and heat, said heat being sufficient, first to dehydrate said silicate and then to re-fuse it into a hard glassy substance.

17. That process of producing an artificial stone article which comprises adding to a solution of soluble silicate a metal compound adapted to form with said silicate an insoluble glass, distributing a fibrous material throughout said silicate so as to form a plastic mass thereof, and molding said mass into an article under heat and pressure.

18. That process of producing an artificial stone article which comprises adding to a solution of soluble silicate a metal compound adapted to form with said silicate an insoluble glass, distributing a fibrous material throughout said silicate so as to form a plastic mass thereof, and molding said mass into an article under heat and pressure, said heat being sufficient to dehydrate said body.

19. That process of producing an artificial stone article which comprises adding to a solution of soluble silicate a metal compound adapted to form with said silicate an insoluble glass, distributing a heat resistant fibrous material throughout said silicate so as to form a plastic mass thereof, and molding said mass into an article under heat and pressure, said heat being sufficient to dehydrate said body, bring about the insoluble-glass producing reaction and re-fuse said mass into a hard glassy substance.

20. That process of producing an artificial stone article which comprises concentrating a solution of soluble silicate until it becomes gummy and adhesive, mixing therewith a fibrous material and a filler material which may be a pigment, so as to form a plastic mass thereof, and molding said plastic mass under pressure, and heat sufficient at least to produce sintering in the mass.

21. That process of producing an artificial stone article which comprises concentrating a solution of a soluble silicate to produce an adhesive gummy mass, mixing into said mass a heat resistant fiber and a metallic compound adapted to form an insoluble glass with said silicate, so as to produce a plastic mass thereof, and molding said plastic mass under heat and pressure.

22. That process of producing an artificial stone article which comprises mixing together a solution of soluble silicate, a heat resistant fiber and a metallic compound adapted to form an insoluble stony body with said silicate, producing a plastic mass of said mixture and molding said plastic mass under heat and pressure.

23. That process of producing an artificial stone article which comprises mixing powdered soluble silicate, heat resistant fibers and a metallic compound adapted to form an insoluble glass with said silicate, introducing enough water to produce a plastic mass thereof and molding said plastic mass under pressure and under sufficient heat to form said insoluble glass.

24. That process of producing an artificial stone article which comprises mixing sodium silicate, fibers and a flux to form a plastic mass thereof and molding an article from said plastic mass under heat and pressure.

25. That process of producing an artificial stone article which comprises mixing together a soluble silicate, a flux, a metallic compound adapted to form an insoluble glass with said soluble silicate and a heat resistant fiber so as to form a plastic mass thereof and mold said mass under pressure and heat sufficient to form said soluble glass.

26. An artificial glass-like stone made up of a sodium silicate base in which fibers are distributed.

27. An artificial glass-like stone made up of a sodium silicate base, inert filler and fiber distributed through said base and filler.

HARRY C. FISHER.